UNITED STATES PATENT OFFICE.

WILLIAM H. THOMAS, OF LOS ANGELES, CALIFORNIA.

CATARRH REMEDY.

SPECIFICATION forming part of Letters Patent No. 369,266, dated August 30, 1887.

Application filed March 26, 1887. Serial No. 232,573. (No specimens.)

*To all whom it may concern:*

Be it known that I, WILLIAM H. THOMAS, of Los Angeles, in the county of Los Angeles and State of California, have invented certain new and useful Improvements in Cartarrh Remedies; and I do hereby declare that the following is a full, clear, and exact description of the invention, which will enable others skilled in the art to which it appertains to make and use the same.

My invention relates to an improved medical compound or ointment, and is designed particularly to be used as a curative agent for cartarrh, although it is equally applicable to the treatment of abraded surfaces, malignant sores, and as an ointment for the face, particularly after shaving, to prevent the contraction of contagious skin diseases.

My improved compound consists of the following ingredients, viz: petrolatum, one ounce; pimento, (powdered allspice,) four grains; boracic acid, (chemically pure), two grains; thymol, (chemically pure,) two grains; subnitrate of bismuth, (chemically pure,) two grains; spirit of wintergreen, three drops; *Cassia lanceolata* leaves, (senna,) one-fourth ounce. These ingredients are prepared and compounded as follows: The boracic acid, thymol, subnitrate of bismuth, and pimento are placed in a mortar and reduced to a fine powder. The leaves of the *Cassia lanceolata* are subjected with the pretrolatum to a sufficient degree of heat to extract the active principle of the leaves, after which the petrolatum is strained off and added to the powdered substances before mentioned with the spirit of wintergreen, the whole being thoroughly commingled and mixed in any convenient manner, forming the compound or ointment, which may be kept in stock or put up in packages for the market.

In using the compound it is applied locally in the usual manner, either by means of the fingers or any material by which the application can be thoroughly effected. The proportions of the ingredients herein cited are found to answer well in practice for general purposes; but they may be varied indefinitely without departing from the spirit of my invention; hence I do not desire to limit myself to the proportions named.

The several ingredients forming my improved compound have well-known medicinal virtues, and when combined as described form an ointment especially applicable to the treatment of cartarrh, malignant sores, abrasions, and other affections where a local remedy can be applied.

Having thus fully described my invention, what I claim, and desire to secure by Letters Patent, is—

The medical compound or ointment herein described, consisting of petrolatum, pimento, boracic acid, thymol, subnitrate of bismuth, spirit of wintergreen, and *Cassia lanceolata*, combined in the proportions substantially as set forth.

In testimony that I claim the foregoing as my own I affix my signature in presence of two witnesses.

WILLIAM H. THOMAS.

Witnesses:
H. B. DE VORE,
P. SELLENSCHIDE.